UNITED STATES PATENT OFFICE

1,921,337
COPPER-CONTAINING AZODYESTUFF

Karl Wiedemann, Leverkusen-I. G. Werk, and Heinrich Clingestein, Cologne-on-the-Rhine, Germany, assignors to General Aniline Works, Inc., New York, N. Y., a Corporation of Delaware No Drawing. Application August 5, 1932, Serial No. 627,672, and in Germany September 21, 1931

3 Claims. (Cl. 260—12)

The present invention relates to new azodyestuffs containing copper in a complex form, more particularly it relates to dyestuffs which may be represented by the general formula:

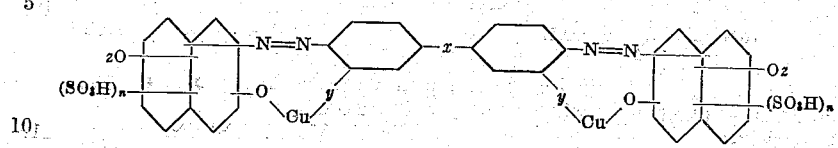

wherein —x— stands for a carbon-carbon-linkage or for a urea- or thiourea-bridge, y stands for an oxygen atom or for the group —COO— attached with the carbon atom to the benzene nucleus, z stands for hydrogen or an alkyl group, such as a methyl or ethyl group and "n" stands for the numbers one or two.

Our new dyestuffs are obtainable by tetrazotizing one molecular proportion of a 4.4'-diaminodiphenyl, the corresponding urea or thiourea containing in o-position to each amino group an alkoxy group or a carboxylic acid group, coupling with two molecular proportions of a dihydroxynaphthalene-mono-or-disulfonic acid, one hydroxy group of which may be etherified by alkyl, and treating the disazodyestuff thus obtained with an agent yielding copper. In case there are coppered such dyestuffs which contain an alkoxy group in o-position to each azo-group coppering is performed under such conditions that the alkoxy group is split up; this can be achieved for example by working at elevated temperatures and under superatmospheric pressure or by coppering with the addition of an organic base or ammonia.

Our new dyestuffs are in form of their alkali metal salts generally dark powders, dyeing cotton generally violet to blue shades of excellent fastness to light.

The invention is illustrated by the following examples, without being limited thereto:

Example 1.—27,2 parts by weight of 4.4'-diaminodiphenyl-3.3'-dicarboxylic acid are tetrazotized and coupled with 48 parts by weight of 2.5-dihydroxynaphthalene-7-sulfonic acid in aqueous soda alkaline solution. The dyestuff is salted out, filtered, re-dissolved in water, the solution is rendered weakly acid, 50 parts by weight of crystallized copper sulfate, dissolved in some water, are added and the solution is heated for 2 hours at 80 to 90° C. The dyestuff having in its free state the probable formula:

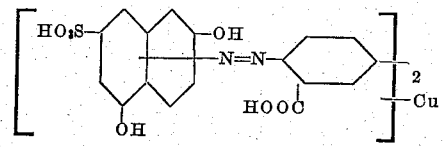

dyes cotton from an alkaline bath bluish-violet shades very fast to light and ironing.

Example 2.—24,4 parts by weight of 4.4'-diamino-3.3'-dimethoxydiphenyl are tetrazotized and coupled in an alkaline solution with 64 parts by weight of 1.8-dihydroxynaphthalene-3.6-disulfonic acid. The dyestuff is isolated, re-dissolved and treated for 5 hours with an ammoniacal solution prepared from 50 parts by weight of crystallized copper sulfate at a temperature of 90° C., salted out and dried at 125° C. The dyestuff having in its free state the following formula:

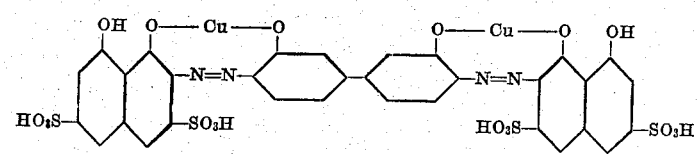

dyes cotton and viscose blue shades of good fastness to light and ironing.

Example 3.—30,2 parts by weight of 4.4'-diamino-3.3'-dimethoxy-diphenylurea are coupled in soda alkaline solution in 48 parts by weight of 2.8-dihydroxynaphthalene-6-sulfonic acid. The dyestuff is isolated, re-dissolved and treated for about 2 hours at 80° C. with an ammoniacal solution prepared from 50 parts by weight of crystallized copper sulfate. The dyestuff thus obtained dyes cotton reddish-blue shades of excellent fastness to light.

Example 4.—30,2 parts by weight of 4.4'-diamino-3.3'-dimethoxydiphenylurea are coupled in soda alkaline solution with 69,6 parts by weight of 1-ethoxy-8-hydroxynaphthalene-3.6-disulfonic acid and the dyestuff is coppered as described in Example 3. The copper-containing dyestuff thus obtained dyes cotton bluish-violet shades of excellent fastness to light.

The same dyestuff is also obtainable by coupling one molecular proportion of 5-nitro-2-amino-1-anisol with one molecular proportion of 1-ethoxy-8-hydroxynaphthalene - 3.6 - disulfonic acid, reducing the nitro group to form the amino group, transforming into the corresponding urea by treating with phosgen and performing the coppering as described in paragraph 1.

A dyestuff having similar properties is obtained when using as tetrazotization component 4.4'-diamino-3.3'-dimethoxy-diphenylthiourea.

We claim:

1. As new products copper-containing azodyestuffs of the probable general formula:

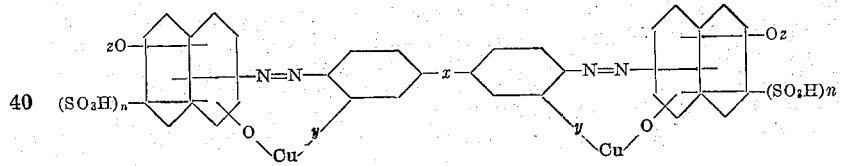

wherein —$x$— stands for a carbon-carbon-linkage, for a urea or thiourea-bridge, $y$ stands for an oxygen atom or for the group —COO— which is attached with the carbon atom to the benzene nucleus, $z$ stands for hydrogen or an alkyl group and "$n$" stands for one of the numbers one and two, the —$y$—Cu—O chain being attached to the naphthalene nucleus in o-position to the azo group, being in form of their alkali metal salts generally dark powders, dyeing cotton generally violet to blue shades of excellent fastness to light.

2. As a new product the copper-containing azo-dyestuff of the following formula:

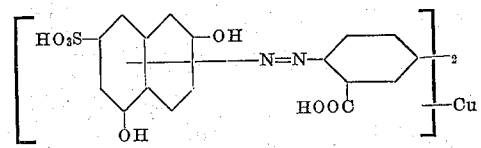

in which the azo-bridge is attached to the naphthalene nucleus in o-position to one of the hydroxy groups, dyeing cotton bluish-violet shades of excellent fastness to light and ironing.

3. As a new product the copper-containing azo-dyestuff of the following formula:

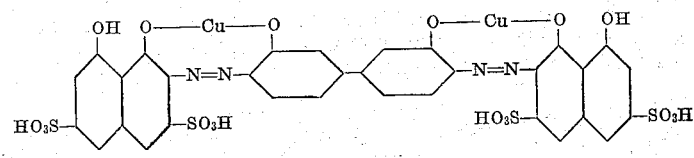

dyeing cotton and viscose blue shades of good fastness to light and ironing.

KARL WIEDEMANN.
HEINRICH CLINGESTEIN.